(12) United States Patent
Oertley

(10) Patent No.: US 6,652,043 B2
(45) Date of Patent: Nov. 25, 2003

(54) REDUCED SOUND TRANSMITTING IDLER FOR TRACK-TYPE VEHICLES

(75) Inventor: Thomas E. Oertley, Dunlap, IL (US)

(73) Assignee: Caterpillar Inc, Peoria, IL (US)

(*) Notice: Subject to any disclaimer, the term of this patent is extended or adjusted under 35 U.S.C. 154(b) by 0 days.

(21) Appl. No.: 10/134,803

(22) Filed: Apr. 29, 2002

(65) Prior Publication Data

US 2002/0113489 A1 Aug. 22, 2002

Related U.S. Application Data

(63) Continuation-in-part of application No. 09/553,592, filed on Apr. 20, 2000, now Pat. No. 6,416,142.

(51) Int. Cl.[7] .............................................. B62D 55/14

(52) U.S. Cl. ........................ 305/137; 305/125; 305/195

(58) Field of Search ................................ 305/136, 137, 305/185, 193, 194, 197, 198, 19, 195, 199, 125; 152/185.1, 187

(56) References Cited

U.S. PATENT DOCUMENTS

| | | | | |
|---|---|---|---|---|
| 3,773,394 A | * | 11/1973 | Grawley | |
| 3,937,528 A | * | 2/1976 | Clemens et al. | |
| 4,034,618 A | * | 7/1977 | Groff et al. | |
| 4,069,856 A | * | 1/1978 | Sogge | |
| RE29,718 E | * | 8/1978 | Reinsma et al. | |
| 4,114,958 A | * | 9/1978 | Boggs | |
| 4,150,858 A | * | 4/1979 | Fox et al. | |
| 4,165,906 A | * | 8/1979 | Fix | |
| 4,359,248 A | * | 11/1982 | Kortering | 305/46 |
| 4,408,646 A | * | 10/1983 | Forsyth | |
| 4,818,041 A | * | 4/1989 | Oertley | |
| 6,033,044 A | * | 3/2000 | Brinkrolf | 305/194 |
| 6,416,142 B1 | * | 7/2002 | Oertley | 305/137 |

* cited by examiner

Primary Examiner—Russell D. Stormer
(74) Attorney, Agent, or Firm—Diana L Charlton; Jeff A Greene

(57) ABSTRACT

An idler for supporting the forward end of an endless track of a track-type tractor has an endless chain resiliently supported on an outer flange of the idler hub. An outer surface of the chain provides a substantially continuous bearing surface for supporting the endless track on the idler.

30 Claims, 9 Drawing Sheets

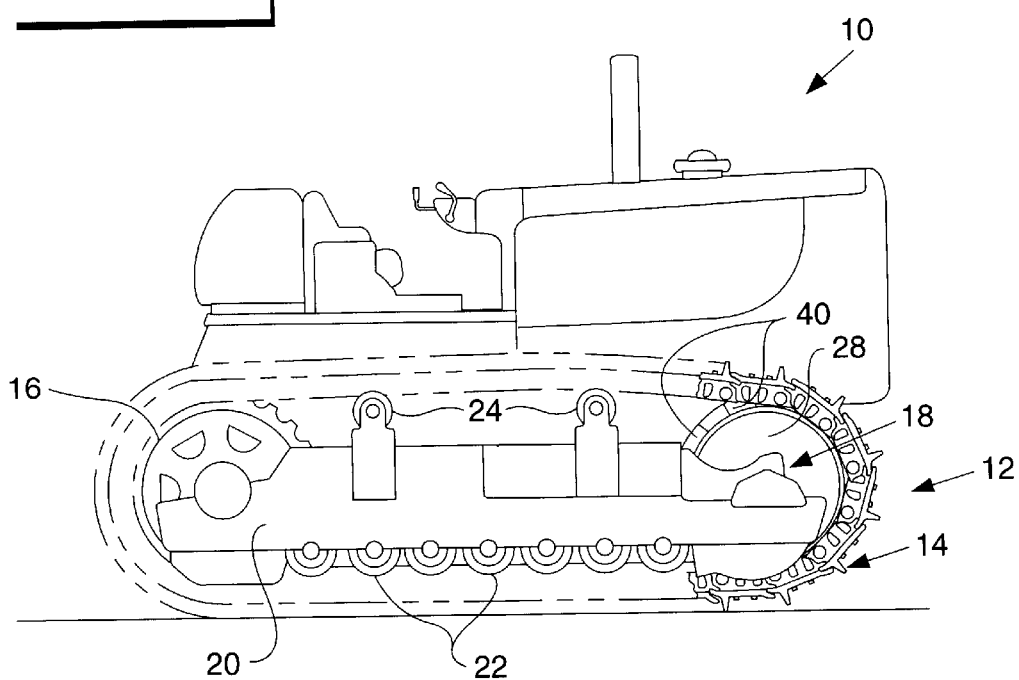
Fig-1-
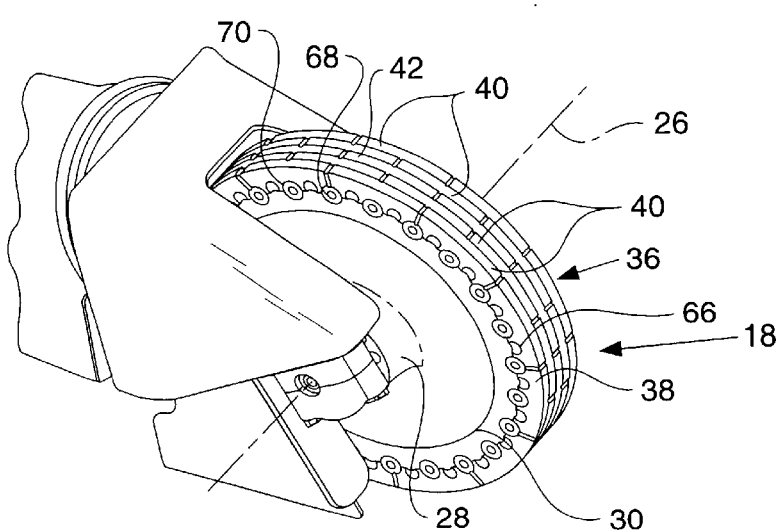
Fig-2-

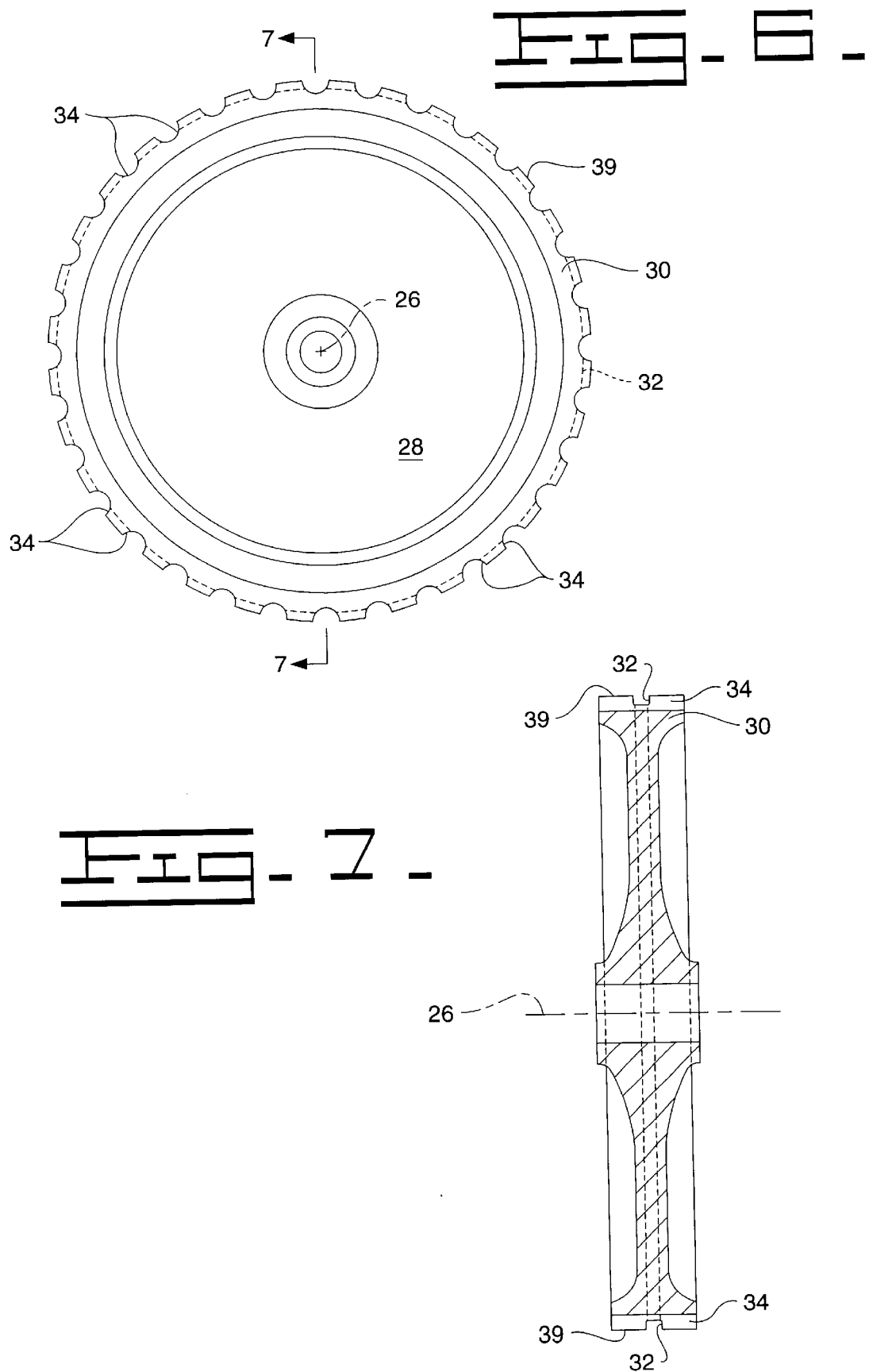

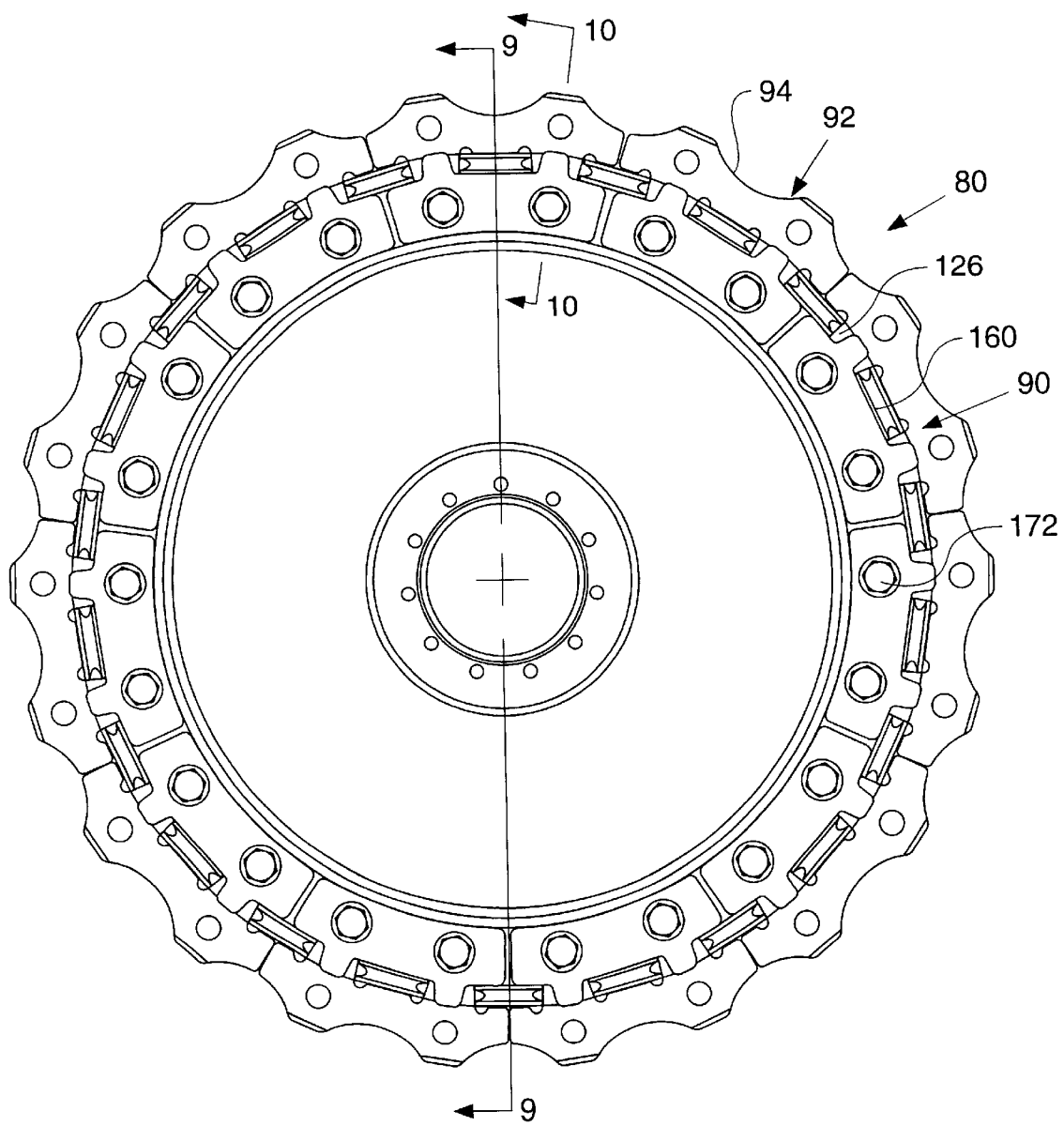

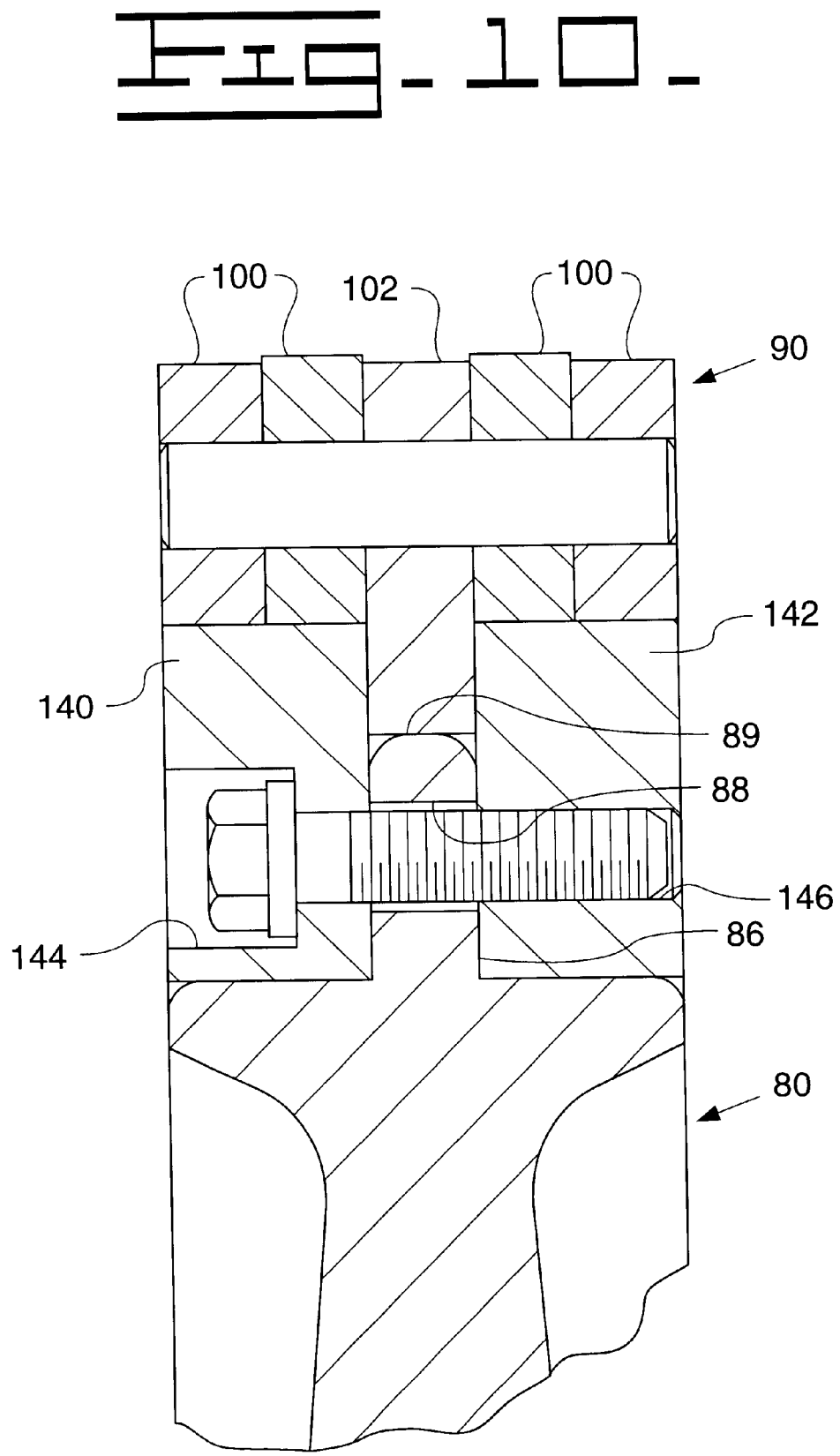
Fig_10_

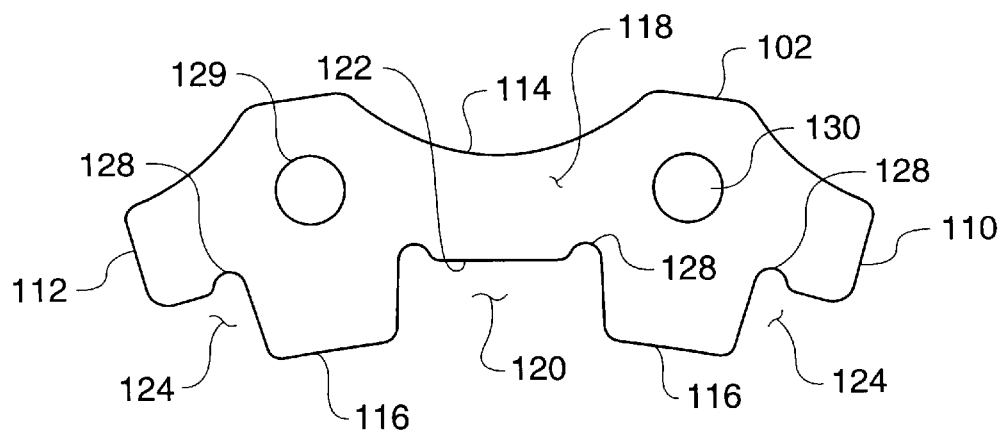
Fig_11_
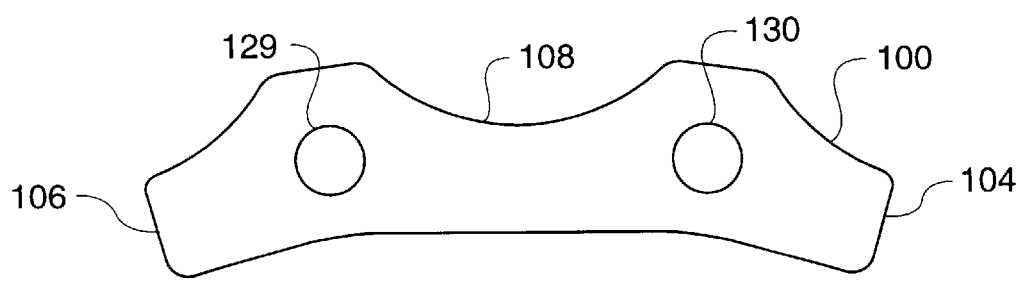
Fig_12_
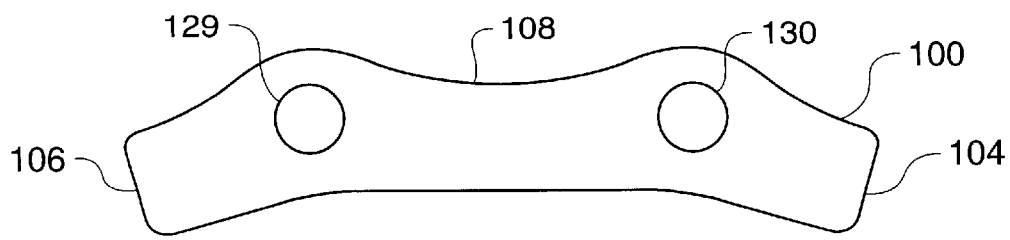
Fig_13_

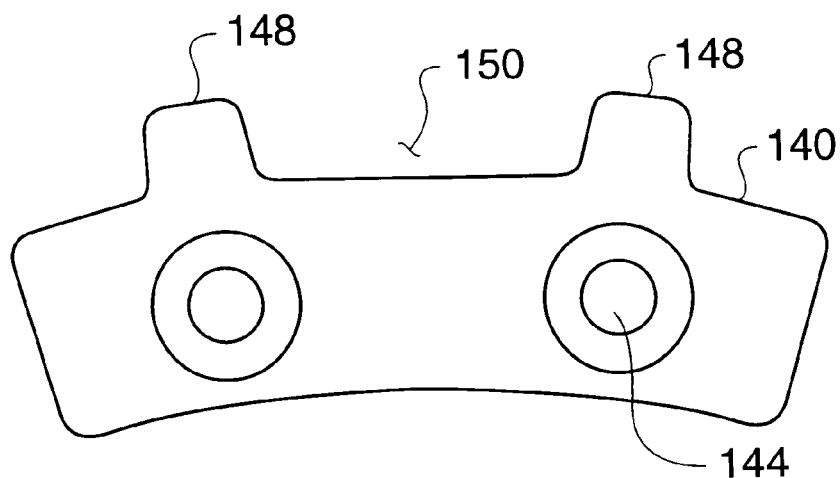
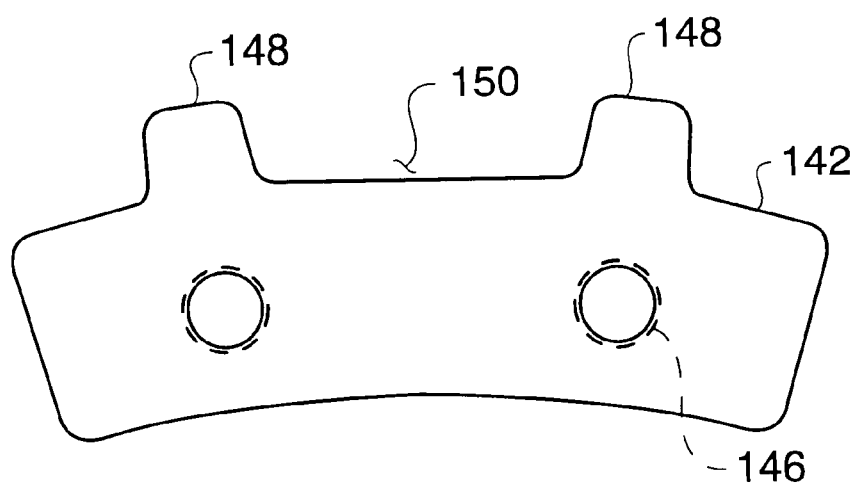

REDUCED SOUND TRANSMITTING IDLER FOR TRACK-TYPE VEHICLES

This application is a continuation-in-part of application Ser. No. 09/553,592 filed Apr. 20, 2000 now U.S. Pat. No. 6,416,142.

TECHNICAL FIELD

This invention relates generally to an undercarriage sound reducing idler for track-type vehicles and more particularly to such an idler that has a resiliently mounted tread surface on the idler.

BACKGROUND

Environmental regulations, both in the United States and in other countries, are increasingly being directed to the suppression of noise emitted by construction equipment such as track-type tractors. In track-type tractors, the undercarriage, i.e., the track assemblies, support rollers, track tensioning assemblies, drive sprockets and idlers, are frequently a major contributor to the overall noise signature of track type equipment.

A great amount of effort has been directed to noise abatement strategies in undercarriage assemblies. For example, U.S. Pat. No. 3,937,528 issued Feb. 10, 1976 to Donald E. Clemens et al., titled SEGMENTED AND CUSHIONED IDLER FOR TRACK-TYPE VEHICLES AND METHOD FOR CARRYING SAME, and assigned to the Assignee of the present invention, describes a support idler directed to reducing the noise level of an endless track during operation of a vehicle. More specifically, Clemens at al. describes an idler having a plurality of arcuate segments circumferentially mounted about a peripheral flange of the idler hub and an elastomeric strip disposed between each of the arcuate segments and the peripheral flange. Each of the arcuate segments is mounted to the peripheral flange by a plurality of bolts. However, during vehicle operation, the elastomeric strips interposed between the arcuate segments and the peripheral flange are compressed during each rotation of the idler. The resultant resilient cyclic compression and recovery of the elastomeric strip during operation of the vehicle eventually results in relaxation of the bolt tension, or stretch, developed when mounting the arcuate segments on the hub flange. This may cause the attachment bolts to eventually loosen. The present invention is directed to overcoming such problems.

SUMMARY OF THE INVENTION

In one aspect of the present invention, a track-type vehicle idler assembly is disposed for rotation about an axis. The idler comprises a hub with an annular flange, an endless chain with a plurality of interconnected segments is mounted on the annular flange of the hub and at least one elastomer is positioned between the endless chain and the annular flange of the hub.

In another aspect of the present invention, a track-type vehicle idler assembly is disposed for rotation about an axis. The idler comprises a hub with an annular flange, an endless chain with a plurality of interconnected segments is mounted on the annular flange of the hub and at least one assembly with an elastomeric portion is positioned between the endless chain and the annular flange of the hub.

In yet another aspect of the present invention, an endless chain assembly for use with a track-type vehicle idler is disclosed. The endless chain assembly comprises a plurality of interconnected segments. The segments are positioned relative to one another so that a substantially continuous outer bearing surface is defined.

BRIEF DESCRIPTION OF THE DRAWINGS

A more complete understanding of the structure and operation of the present invention may be had by reference to the following detailed description when taken in conjunction with the accompanying drawings, wherein:

FIG. 1 is a side elevational view of a track-type tractor having a reduced sound transmitting idler embodying the present invention;

FIG. 2 is an enlarged three-dimensional view of the idler embodying the present invention, showing the idler rotatably mounted on a portion of the subframe of the track-type tractor;

FIG. 6 is an elevational view of the hub of the idler embodying the present invention;

FIG. 7 is a cross-sectional view of the hub of the idler embodying the present invention, taken along the line 7—7 of FIG. 6;

FIG. 8 is an elevational view of an alternative embodiment of the idler;

FIG. 10 is a cross-sectional view of the idler embodying the alternative embodiment of the present invention, taken along the line 10—10 of FIG. 8;

FIGS. 11–13 are side views of the outer and center segments of the endless chain of the idler embodying the alternative embodiment of the present invention;

FIGS. 16–17 are side views of the retainers used to hold the assembly between the endless chain and the hub.

DETAILED DESCRIPTION

Figure 3:
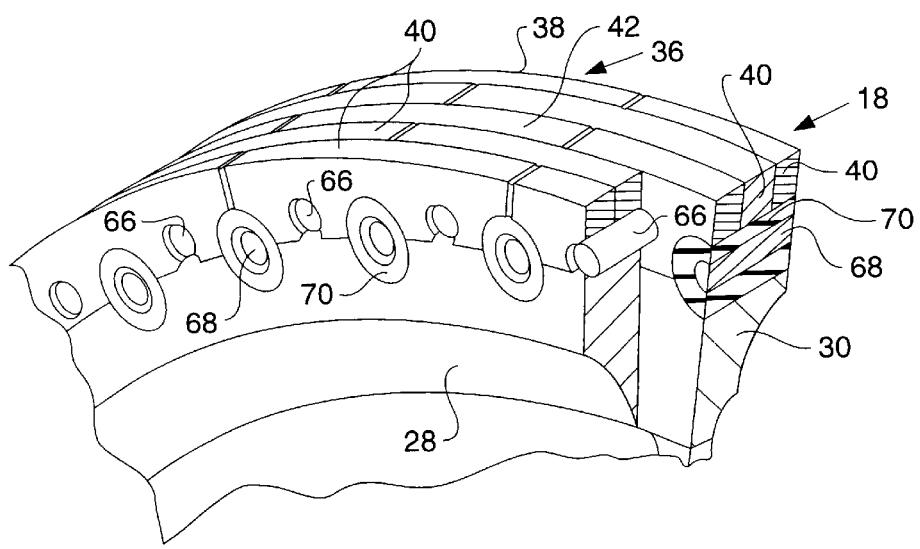
FIG. 3 is an enlarged three-dimensional view of a portion of the idler embodying the present invention, with a portion of the outer two rows of arcuate segments cut away to better show details of the center arcuate segment.

FIG. 1 illustrates a track-type tractor 10 having a pair of endless track assemblies 12, one of which is shown, mounted on respective sides of the tractor 10. Each track assembly 12 has an endless track 14 entrained about a drive sprocket 16 at the rearward end of the tractor 10, and about an idler 18 embodying the present invention at the forward end. The idler 18 is rotatably mounted on a sub-frame 20 that has a plurality of track rollers 22 rotatably mounted thereon, along with a plurality of carrier rollers 24, in a conventional manner.

A first embodiment of the sound reducing idler 18 is illustrated in FIGS. 2–7. The idler 18 rotates about an axis of rotation 26 and has a centrally disposed hub portion 28 that has an annual flange 30 disposed about the outer circumferential periphery of the hub 28. The annular flange 30 has an annular groove 32 defined in the outer peripheral surface of the flange 30 and a plurality of spaced-apart, circular openings 34 also defined in the outer periphery of the flange 30. The circular openings 34 extend in a direction parallel with the axis 26 of the idler 18 and intersect a portion of the annular groove 32 defined about the periphery of the flange 30.

The idler 18 also has an endless chain 36 of the type often referred to as a "silent chain", as disclosed by the American Standards Association B29.2, resiliently mounted on the annular flange 30. The chain 36 forms a rim 38 that provides a substantially continuous peripheral bearing surface 38 about the idler 18 for the endless track 14.

The endless chain 36 is formed of a plurality of outer arcuate segments 40 arranged in at least two, and preferably four concentric bands about the flange 30 of the idler 18, and a plurality of center arcuate segments 42 arranged in a single band about the annular flange 30 of the idler 18, as illustrated in FIG. 3.

Figure 4:
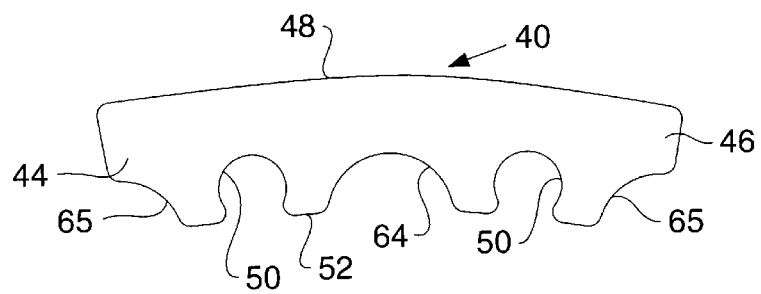
FIG. 4 is a side view of the outer segments of the endless chain of the idler embodying the present invention.

A typical one of the outer arcuate segments 40 is illustrated in FIG. 4. Each one of the outer arcuate segments 40 have a first end 44, a second end 46, a radially outward track bearing surface 48, and a pair of spaced-apart, axially oriented first spaced apart circular openings 50 extending inwardly from a radially inner surface 52 of the arcuate, or curved outer segments 40.

Figure 5:
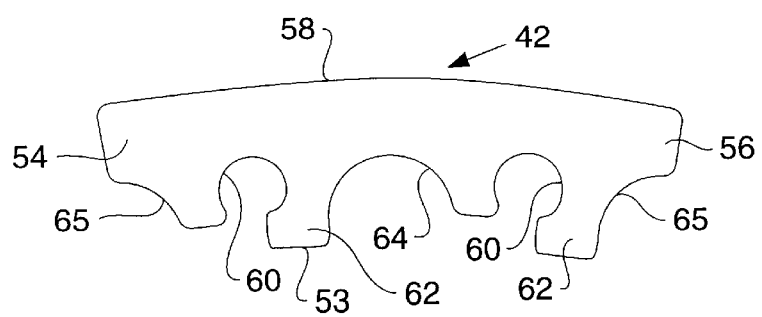
FIG. 5 is a side view of the center segments of the endless chain of the idler embodying the present invention.

A representative one of the center arcuate segments 42 is shown in FIG. 5. The construction of the center arcuate segments 42 is similar to that of the outer arcuate segments 40. Each of the center arcuate segments 42 have spaced apart first and second ends 54, 56, an arcuately curved outer track bearing surface 58 and a pair of spaced apart circular openings 60 extending inwardly from a radially inner surface 53. The primary difference between the center arcuate segments 42 and the outer arcuate segments 40 are that each of the center segments 42 have a pair of radially inwardly extending tabs 62 adapted to be received within the annular groove 32 defined in the flange 30. Each of the outer segments 40 and the center segments 42 have a third centrally disposed circular opening 64 that is positioned substantially equidistantly between the respective first ends 44, 54 and second ends 46, 56 and extends inwardly from the radially innermost surface of the respective segments 40, 42. In addition, each of the outer and center segments 40, 42 have a portion 65 of the third circular openings 64 disposed at each of the first ends 44, 54 and second ends 46, 56 which cooperate with a leading or following segment 40, 42 disposed in the same circular band, or row, to provide a full one of the third circular openings 64. Thus, each of the segments 40, 42, have a full third circular opening 64, and a pair of partial circular openings.

The endless chain 36 is first assembled by itself, and then mounted on the flange 30 of the idler 18 as illustrated in FIGS. 2 and 3. Advantageously, the arcuate segments 40, 42 are positioned with one of the pair of circular openings 50, 60 adjacent the first end 44 of one segment being aligned with the circular opening 50, 60 adjacent a second end of an adjacent segment 40, 42. Thus, adjacent rows of the segments 40, 42 are positioned so that the circular opening 50, 60 of one segment is aligned with the other one of the pair of circular openings 50, 60 at an opposite end of respective adjacently disposed segments.

The endless chain 36 is then assembled by inserting an articulation pin 66 through the respectively aligned openings 50, 60 in the outer and center segments 40, 42. The outer ends of each of the articulation pins 36 is desirably welded to the outer surface of the outermost arcuate segment 40. The assembled chain 36 is then installed over the flange 30 by aligning the inwardly extending tabs 62 of the center segments 42 with the openings 34 in the outer flange 30 of the idler hub 28. The chain 36 is then slid axially over the flange 30 until the inwardly extending tabs 62 are axially aligned with the annular groove 32 formed in the flange 30. After the chain 36 is axially aligned on the flange 30, it is rotated radially to bring the third circular openings 64, 65 provided in the segments 40, 42 into radial alignment with the circular openings 34 in the flange 30. At that position, the inwardly extending tabs 62 of the center segments 42 are positioned in the annular groove 32 between the circular openings 34.

After alignment of the third circular openings 64 in each of the segments 40, 42 with the axially extending circular openings 34 in the flange 30, the elastomeric bushings 70 are inserted into the aligned openings 64, 34, and then the locking pins 68 driven into the elastomeric bushings 70. The endless chain 36 is thereby resiliently supported on the hub 28 by a plurality of pins 68 disposed within respective elastomeric bushings 70 inserted within the axially aligned third circular openings 64 in the segments 40, 42 and the axially extending circular openings 34 defined in the flange 30 of the hub 28. The elastomeric bushings 70 are preferably formed of rubber or other elastomeric material that has relatively high compressive strength and wear resistance.

When assembled, the radially innermost surfaces 52, 53 of the endless chain 36 are supported a small distance away from a radially outermost surface 39 of the flange 30 by the elastomeric bushings 70. During operation of the vehicle and rotation of the idler 18, and consequent compression of the elastomeric bushings 70 by the weight of the vehicle and endless track 14, the amount of deflection of the elastomeric bushing 70 is limited by the initial free clearance between the radially innermost surfaces 52, 53 of the arcuate segments 40, 42 and the outer surface 38 of the flange 30. In an illustrative embodiment, a radial clearance of about 1–2 mm is provided between the outer peripheral surface 39 of the flange 30 and the radially innermost surfaces 52, 53 of the arcuate segments 40, 42 when assembled on the hub 28. The bottom surfaces of the radially inwardly extending tabs 62 of the center segments 42 are spaced a similar distance from the bottom of the annular groove 32 in the flange 30.

In the preferred embodiment of the present invention, the endless chain 36 is composed of two rows, or bands of outer circular segments 40 disposed on each side of a single band of center circular segments 42. In other embodiments, the chain 36 may be composed of fewer segments, for example a single band of outer arcuate segments 40 disposed on each side of a central band of center arcuate segments 42, or alternatively more than two adjacent bands of outer segments 40 on each side of the center band. It is desirable, regardless of the number of adjacent rows, or bands, of circular segments 40, 42 used to form the endless chain 36, that the pins 68 disposed within the elastomeric bushings 70 extend through at least three of the links 40, 42 disposed in adjacent relationship about the periphery of the flange 30. Also, although the pin 68 and resilient support bushings 70 are illustrated as having circular cross sections, other pin and/or bushing shapes, for example, oval, rectangular, octagonal or other cross-sectional shapes, could be used if so desired.

A second embodiment of a sound reducing idler assembly 80 is illustrated in FIGS. 8–17. In this embodiment, the idler assembly 80 rotates about an axis of rotation 82 and has a centrally disposed hub portion 84 that has an annual flange 86 disposed about the outer circumferential periphery of the hub 84. A plurality of spaced-apart, circular openings 88 are defined in the outer periphery of the flange 86 along with an outer peripheral surface 89, as illustrated best in FIG. 10. The circular openings 88 extend in a direction parallel with the axis 82 of the idler 80.

The idler 80 also has an endless chain assembly 90 of the type often referred to as a "silent chain", as disclosed by the American Standards Association B29.2, resiliently mounted on the annular flange 86. The chain 90 forms a rim 92 that provides a substantially continuous peripheral bearing surface 94 about the idler 80 for the endless track 14.

Figure 9:
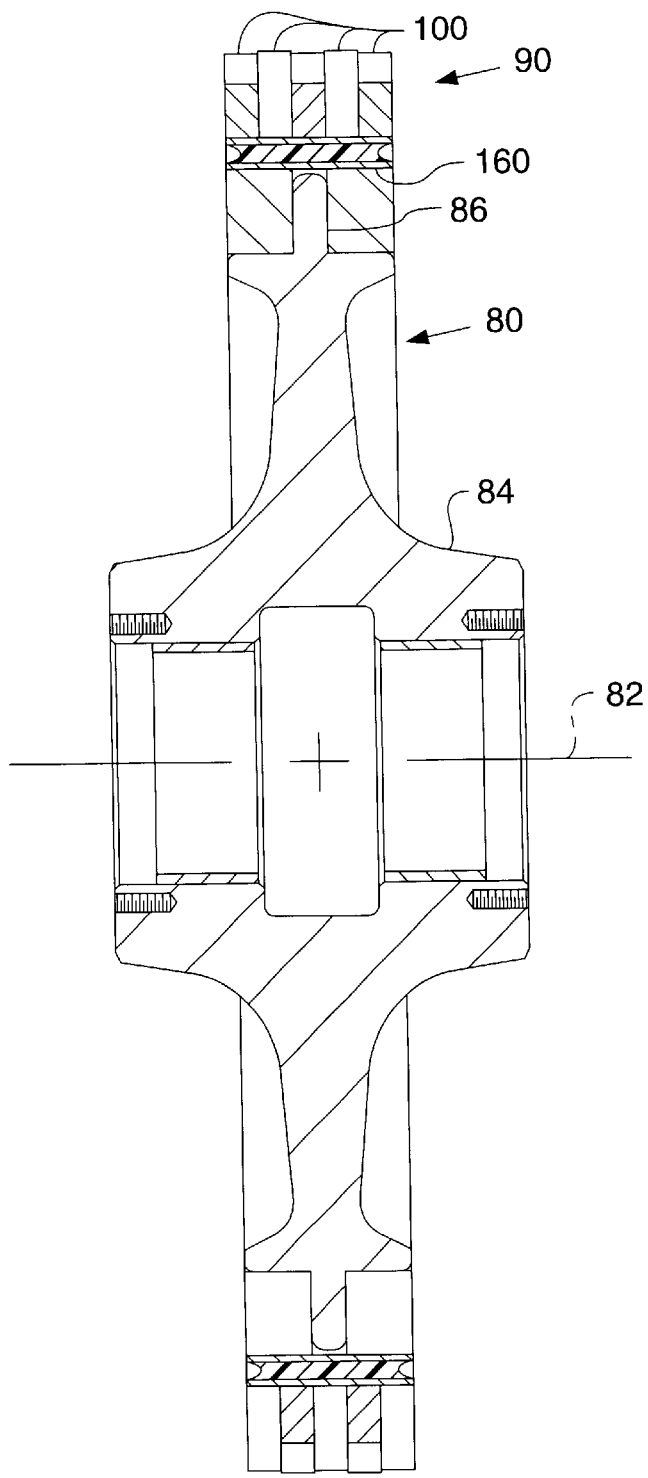
FIG. 9 is a cross-sectional view of the idler embodying the alternative embodiment of the present invention, taken along the line 9—9 of FIG. 8.

The endless chain assembly 90 is formed similar to that of the first embodiment in that a plurality of outer arcuate segments 100 are arranged in at least two, and preferably four concentric bands about the flange 86 of the idler 80, and a plurality of center arcuate segments 102 are arranged in a single band about the annular flange 86 of the idler 80, as illustrated best in FIGS. 9-10.

A typical one of the outer arcuate segments 100 is illustrated in FIGS. 12-13. Each one of the outer arcuate segments 100 has a first end 104, a second end 106, and a radially outward arcuate track bearing surface 108.

A representative one of the center arcuate segments 102 is illustrated in FIG. 11. The construction of the center arcuate segments 102 is similar to that of the outer arcuate segments 100 in that each of the center arcuate segments 102 has spaced apart first and second ends 110, 112 and an arcuate outer track bearing surface 114. The primary difference between the center arcuate segments 102 and the outer arcuate segments 100 are that each of the center segments 102 has a pair of radial tab portions 116 extending radially outwardly from a body portion 118 and inwardly toward the hub 84. Further, the center segments 102 have a centrally disposed pocket 120 that is positioned between the tab portions 116 and substantially equidistantly between the respective first ends 104, 110 and second ends 106, 112 to define an innermost surface 122 of the center segments 102. In addition, the center segments 102 have a portion 124 of a second and third pocket disposed at each of the first and second ends 110, 112 which cooperate with a leading or following center segment 102 disposed in the same circular band, or row, to define full second and third pockets 126 in the endless chain assembly 90. Thus, each of the center segments 102, have one full pocket 120 and two half pockets 124. The pockets 120, 124 include at least one groove 128 extending radially from the innermost surface 122 of the center segments 102 toward the bearing surface 114. The outer and center arcuate segments 100, 102 each include a pair of spaced openings 129, 130.

A plurality of inner and outer retainers 140, 142 is connected to the flange 86 of the idler 80. A representative one of the inner retainers 140 is shown in FIG. 16 and a representative one of the outer retainers 142 is shown in FIG. 17. The inner retainer 140 has a counterbored pair of openings 144 and the outer retainer 142 has a pair of threaded openings 146 therethrough. Each of the inner and outer retainers 140, 142 has a pair of spaced tab portions 148 extending radially outwardly from the idler 80 to define a holding portion 150.

The endless chain 90 is first assembled by itself, as in the first embodiment. Advantageously, the outer and center arcuate segments 100, 102 are positioned so that the openings 129, 130 of one segment are aligned with the respective openings 129, 130 of an adjacent segment. Thus, adjacent rows of the segments are positioned so that the openings 129, 130 of one segment are aligned with the other pair of openings 129, 130. An articulation pin (not shown) is positioned in any suitable manner, such as a press-fit, through the respectively aligned openings 129, 130 in the outer and center segments 100, 102. The outer ends of the articulation pins (not shown) are desirably welded to the outer surface of the outermost arcuate segments 100. It should be understood that the interconnection of the segments 100, 102 forms the substantially continuous bearing surface 94 through the relationship of the bearing surfaces 108, 114. Further, it should be understood that the entire rim 92 of the endless chain assembly 90 has a surface that includes substantial material consistency so that minimal air spacing is found at the surface. This advantage is present in both the first and second embodiments so that wear characteristics of the bearing surface 94 is maximized.

Figure 14:
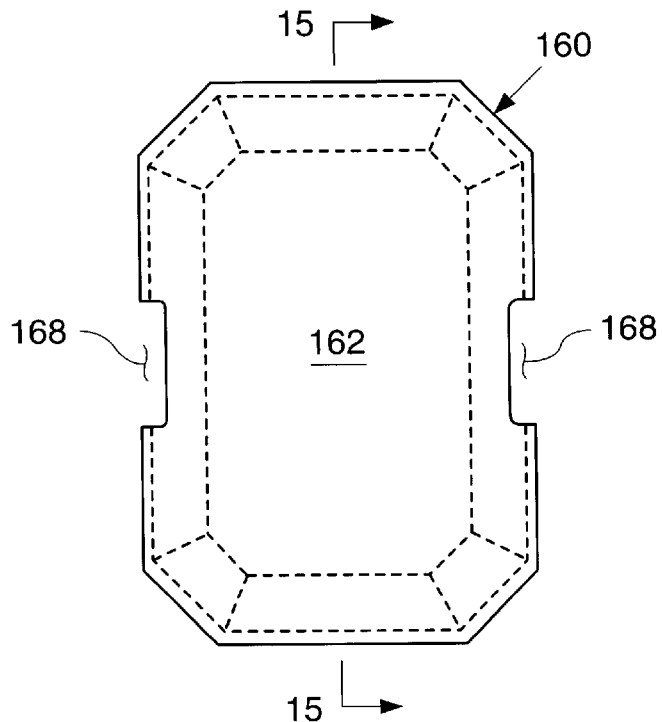
FIG. 14 is an elevational view of an assembly within the alternative embodiment having an elastomeric portion positioned between the endless chain and the hub.
Figure 15:
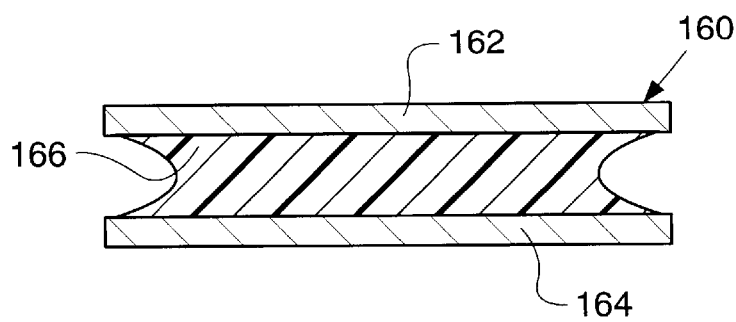
FIG. 15 is a cross-sectional view of the assembly having the elastomeric portion, taken along the line 15—15 of FIG. 14.

After assembly of the segments 100, 102, a resilient member 160 is positioned within the pockets 120, 126. A representative one of the resilient members 160 is shown in FIGS. 14-15. The resilient member 160 is an assembly that includes a pair of plates 162, 164 and a central elastomeric portion 166 connected with the plates 162, 164 and positioned therebetween. It should be obvious that any one of a number of assemblies having an elastomeric portion may be used. The elastomeric portion 160 is preferably formed of rubber or other elastomeric material that has relatively high compressive strength and wear resistance.

In the present assembly 160, the elastomeric portion 166 is bonded in any suitable manner with the plates 162, 164. The plates 162, 164 each include a notched portion 168 on either side that mechanically locks in a mating relationship with the grooves 128 in the center arcuate segments 102.

After the resilient members 160 are positioned in the pockets 120, 126, the endless chain assembly 90 is mounted on the flange 86 of the idler 80 as illustrated in FIG. 8. The endless chain assembly 90 may be radially rotated to locate the inner and outer retainers 140, 142 for connection on opposite sides of the flange 86 of the idler 80. The retainers 140, 142 are connected to the flange 86 by a pair of bolts, one of which is shown at 172, extending through the openings 144 of the inner retainer 140 and the openings 88 in the flange 86 and threaded into the threaded opening 146 of the outer retainer 142. The tab portions 116 of the center arcuate segments 102 are positioned between the inner and outer retainers 140, 142. Upon assembly, the retainers 140, 142 compress the elastomeric portion 166 of the resilient members 160 to preload the assembly and hold the resilient members 160 within the pockets 120, 126. Also, the position of the retainers 140, 142 provides side loading protection when certain impacts occur on the endless chain 90. Further, the retainers 140, 142 act as a radial stop between the between the segments 100 and the flange 86 and prevent rotation of the entire endless chain assembly 90. The endless chain assembly 90 is now resiliently supported on the hub 84 due to the positioning of the resilient members 160.

When assembled, the radially innermost surface 122 of the center arcuate segment 102 is supported a small distance away from the outer peripheral surface 89 of the flange 86 to define a slight air gap therebetween. During operation of the vehicle and rotation of the idler 80, and consequent compression of the elastomeric portion 166 by the weight of the vehicle and endless track 14, the amount of deflection of the elastomeric portion 166 is limited by the initial free clearance between the tab portions 116 and the inner diameter of the outer segments 100. The mechanical stop defined by the tab portions 116 and the segments 100 acts to protect the elastomeric portion 166 from damage that would occur from overextending its elastomeric properties.

INDUSTRIAL APPLICABILITY

The reduced sound transmitting idler 18, 80 of the first and second embodiments for the present invention are particularly useful in the endless track assemblies of track-type vehicles working in construction areas that are sensitive to the amount of noise generated by construction equipment.

The elastomeric bushings 70 of the first embodiment positioned between the outer flange 30 of the hub 28 and the innermost surfaces 52, 53 of the linked arcuate segments 40, 42 provide an elastomeric cushion support for the chain 36 encompassing the idler 18. The radially outermost surfaces of the curved segments 40, 42 of the chain 36 provide bearing surfaces 48, 58 for the endless track 14 entrained about the idler 18 and the drive sprocket 16. More specifically, the elastomeric bushings 70 provide a cushion support of the circular segments 40, 42 supporting the endless track 14, and thereby effectively limit the transmission of noise between the endless track 14 and the idler 18.

Further, the elastomeric portion 166 of the assembly 160 for the second embodiment provides a similar cushion support for the endless chain assembly 90 encompassing the idler 80. The radially outermost surfaces of the segments 100, 102 of the endless chain assembly 90 provide a bearing surface 94 for the endless track 14 entrained about the idler 80 and the drive sprocket 16. More specifically, bearing surface 94 is formed by the bearing surfaces 108, 114 of the respective segments 100, 102 so that a track bushing (not shown) may be positioned therein. It should be understood that although the bearing surfaces 108, 114 are formed to position a track bushing (not shown) therein, an arcuate surface, similar to the first embodiment may be used and will achieve similar results. It should be understood that the entire rim 92 of the endless chain assembly 90 is advantageously designed so that the segments 100, 102 interconnect and provide continuous material along the periphery that defines the radially outermost surface of the segments 100, 102. As with the first embodiment, the elastomeric portion 166 provides a cushion for effectively limiting the transmission of noise between the endless track 14 and the idler 80.

What is claimed is:

1. A track-type vehicle having an endless track mounted on opposite sides thereof, the vehicle comprising:
   an idler for supporting a forward portion of each of the endless tracks, each of the idlers being disposed for rotation about an axis and having a hub with an annular flange;
   an endless chain having a plurality of interconnected segments being mounted on said annular flange to provide a substantially continuous bearing surface for said endless track about said idler; and
   at least one elastomer positioned between the endless chain and the annular flange of the hub.

2. The vehicle of claim 1, wherein the at least one elastomer is positioned along a predetermined portion of the endless chain and the annular flange of the hub.

3. The vehicle of claim 1, wherein at least one of each said plurality of interconnected segments have a radially inner surface and the annular flange of the hub has an outer peripheral surface, including a plurality of elastomers radially spaced along the endless chain and positioned between the inner surface of the at least one segments and the outer surface of the flange.

4. The vehicle of claim 3, wherein the plurality of elastomers are elastomeric bushings.

5. A track-type vehicle having an endless track mounted on opposite sides thereof, the vehicle comprising:
   an idler for supporting a forward portion of each of the endless tracks, each of the idlers being disposed for rotation about an axis and having a hub with an annular flange;
   an endless chain having a plurality of interconnected segments being mounted on said annular flange to provide a substantially continuous bearing surface for said endless track about said idler; and
   at least one assembly having an elastomeric portion being positioned between the endless chain and the annular flange of the hub.

6. The vehicle of claim 5, wherein the assembly is positioned along a predetermined portion of the endless chain and the annular flange of the hub.

7. The vehicle of claim 5, wherein at least one of each said plurality of interconnected segments have a radially inner surface and the annular flange of the hub has an outer peripheral surface, including a plurality of assemblies being radially spaced along the endless chain and positioned between the inner surface of the at least one segments and the outer surface of the flange.

8. The vehicle of claim 7, wherein each assembly includes a pair of plates on opposite sides of the elastomeric portion, said plates being connected with the elastomeric portion.

9. The vehicle of claim 8, wherein the mounting of the endless chain on the flange includes preloading the elastomeric portion of each assembly.

10. A track-type vehicle idler assembly disposed for rotation about an axis thereof, comprising:
    a hub having an annular flange;
    an endless chain having a plurality of interconnected segments being mounted on said annular flange of the hub; and
    at least one elastomer positioned between the endless chain and the annular flange of the hub.

11. The vehicle of claim 10, wherein the at least one elastomer is positioned along a predetermined portion of the endless chain and the annular flange of the hub.

12. The vehicle of claim 10, wherein at least one of each said plurality of interconnected segments have a radially inner surface and the annular flange of the hub has an outer peripheral surface, including a plurality of elastomers radially spaced along the endless chain and positioned between the inner surface of the at least one segments and the outer surface of the flange.

13. The vehicle of claim 12, wherein the plurality of elastomers are elastomeric bushings.

14. A track-type vehicle idler assembly disposed for rotation about an axis thereof, comprising:
    a hub having an annular flange;
    an endless chain having a plurality of interconnected segments being mounted on said annular flange of the hub; and
    at least one assembly having an elastomeric portion being positioned between the endless chain and the annular flange of the hub.

15. The vehicle of claim 14, wherein the assembly is positioned along a predetermined portion of the endless chain and the annular flange of the hub.

16. The vehicle of claim 14, wherein at least one of each said interconnected segments have a radially inner surface and the annular flange of the hub has an outer peripheral surface, including a plurality of assemblies being radially spaced along the endless chain and positioned between the inner surface of the at least one segments and the outer surface of the flange.

17. The vehicle of claim 16, wherein each assembly includes a pair of plates on opposite sides of the elastomeric portion, said plates being connected with the elastomeric portion.

18. The vehicle of claim 17, wherein the mounting of the endless chain on the flange includes preloading the elastomeric portion of each assembly.

19. The vehicle of claim 14, including means for preloading the elastomeric portion and holding each of the assemblies between the endless chain and the annular flange of the hub.

20. An endless chain assembly connected to the outer peripheral surface of a hub of a track-type vehicle idler, said endless chain assembly comprising:
a plurality of interconnected segments, the segments being positioned relative to one another to define a substantially continuous outer bearing surface.

21. The endless chain assembly of claim 20, wherein at least one segment of the interconnected segments includes a tab portion opposite the outer bearing surface.

22. An endless chain assembly connected to the outer peripheral surface of a hub of a track-type vehicle idler, said endless chain assembly comprising:
a plurality of interconnected segments, the segments being positioned relative to one another to define a substantially continuous outer bearing surface;
a resilient member in engagement with at least one segment of the interconnected segments; and
retaining means for holding the resilient member in engagement with the at least one segment.

23. The endless chain assembly of claim 22, wherein the resilient member is an elastomeric bushing.

24. The endless chain assembly of claim 23, wherein the resilient member is an assembly including an elastomeric portion.

25. The endless chain assembly of claim 24, wherein the assembly includes a pair of plates on opposite sides of the elastomeric portion, said plates being connected with the elastomeric portion.

26. The endless chain assembly of claim 22, wherein the at least one of said interconnected segments includes a body portion having a tab portion extending therefrom opposite the outer bearing surface and a pocket formed within the body portion.

27. The endless chain assembly of claim 26, wherein the assembly is in a mating relationship with the pocket.

28. The endless chain assembly of claim 26, wherein the retaining means holds the assembly within the pocket.

29. The endless chain assembly of claim 26, wherein the at least one interconnected segment includes a portion of a pocket at a first end portion and a portion of a pocket at a second end portion, the pocket portions of each adjacent at least one interconnected segment defining a plurality of radially spaced pockets along the inner surface of said endless chain assembly.

30. The endless chain assembly of claim 29, wherein an assembly is positioned within each of the pockets formed along the inner surface of the at least one interconnected segments.

* * * * *